(12) United States Patent
Walunj et al.

(10) Patent No.: US 8,827,642 B2
(45) Date of Patent: Sep. 9, 2014

(54) FLEXIBLE SEAL FOR TURBINE ENGINE

(75) Inventors: Jalindar Appa Walunj, Bangalore (IN); Brian Peter Arness, Greenville, SC (US); Mark Steven Honkomp, Taylors, SC (US); Scott Edmond Ellis, Easley, SC (US); Prashant Shukla, Bangalore (IN); Narayayanaswamy Kuruboor Veerabhadrappa, Bangalore (IN)

(73) Assignee: General Electric Company, Schenectady, NY (US)

( * ) Notice: Subject to any disclaimer, the term of this patent is extended or adjusted under 35 U.S.C. 154(b) by 737 days.

(21) Appl. No.: 13/018,130

(22) Filed: Jan. 31, 2011

(65) Prior Publication Data

US 2012/0195743 A1  Aug. 2, 2012

(51) Int. Cl.
*F01D 11/00* (2006.01)
*F01D 5/30* (2006.01)

(52) U.S. Cl.
CPC .......... *F01D 11/006* (2013.01); *F05D 2250/75* (2013.01); *F05D 2240/55* (2013.01); *Y02T 50/672* (2013.01)
USPC ........ 416/1; 416/191; 416/193 A; 416/219 R; 416/239; 416/248; 277/644; 277/647

(58) Field of Classification Search
CPC ....... F01D 11/006; F01D 11/008; F02C 7/28; F05D 2240/55
USPC ....... 277/644, 647; 416/193 R, 193 A, 219 R, 416/220 R, 1, 190–192, 239, 248, 500; 415/113, 135–136, 138–139
See application file for complete search history.

(56) References Cited

U.S. PATENT DOCUMENTS

| 3,058,750 | A | * | 10/1962 | Taylor ........................... 277/312 |
| 4,603,892 | A | * | 8/1986 | Abbes et al. ................... 277/627 |
| 5,211,407 | A | | 5/1993 | Glynn et al. |
| 5,275,534 | A | | 1/1994 | Cameron et al. |
| 5,318,405 | A | | 6/1994 | Meade et al. |
| 5,797,604 | A | * | 8/1998 | Inagaki et al. ................ 277/647 |
| 5,967,745 | A | | 10/1999 | Tomita et al. |
| 6,086,329 | A | | 7/2000 | Tomita et al. |
| 6,273,683 | B1 | | 8/2001 | Zagar et al. |
| 6,315,298 | B1 | * | 11/2001 | Kildea et al. .................. 277/433 |
| 6,578,849 | B2 | | 6/2003 | Haje |
| 6,579,065 | B2 | | 6/2003 | Scott et al. |
| 7,090,466 | B2 | * | 8/2006 | Honkomp et al. ........ 416/193 A |
| 7,321,044 | B2 | | 1/2008 | Platzek et al. |
| 2002/0182073 | A1 | * | 12/2002 | Takahashi et al. .......... 416/96 R |

(Continued)

FOREIGN PATENT DOCUMENTS

WO  2007063128  6/2007

*Primary Examiner* — Christopher Verdier
(74) *Attorney, Agent, or Firm* — Fletcher Yoder, P.C.

(57) ABSTRACT

A system including: a first turbine segment comprising a first blade coupled to a first shank. The system also includes a second turbine segment including a second blade coupled to a second shank, as well as an elongated flexible seal disposed in a gap between the first and second shanks. The elongated flexible seal includes an opening configured to channel a fluid flow into a hollow region of the elongated flexible seal to induce expansion of the elongated flexible seal in the gap.

20 Claims, 5 Drawing Sheets

(56) References Cited

U.S. PATENT DOCUMENTS

| | | | |
|---|---|---|---|
| 2004/0175262 A1* | 9/2004 | Burdgick | 415/111 |
| 2004/0175263 A1* | 9/2004 | Munshi et al. | 415/111 |
| 2005/0220611 A1* | 10/2005 | Bhate et al. | 415/173.3 |
| 2007/0014668 A1 | 1/2007 | Engle | |
| 2007/0269315 A1* | 11/2007 | Funk et al. | 416/219 R |
| 2008/0008593 A1 | 1/2008 | Zagar et al. | |
| 2008/0106046 A1* | 5/2008 | Datta et al. | 277/644 |
| 2010/0019460 A1* | 1/2010 | Paquin et al. | 277/595 |

* cited by examiner

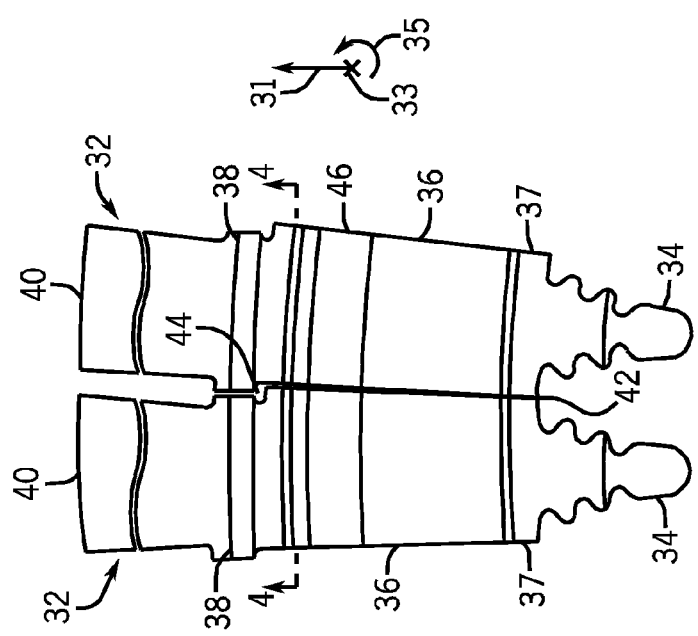
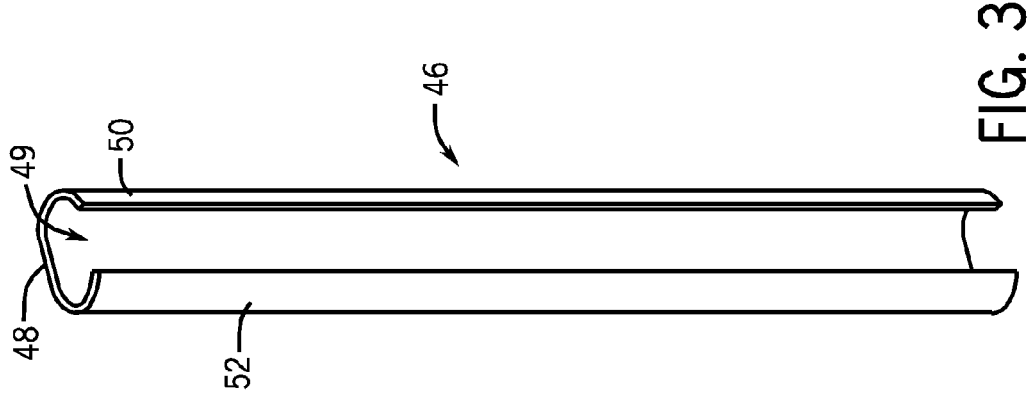

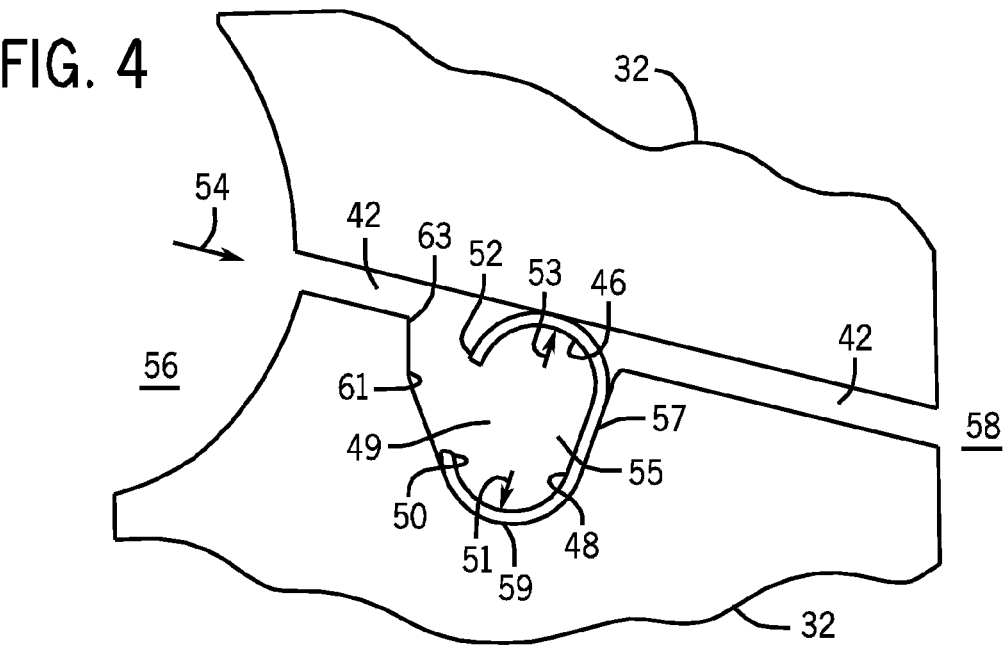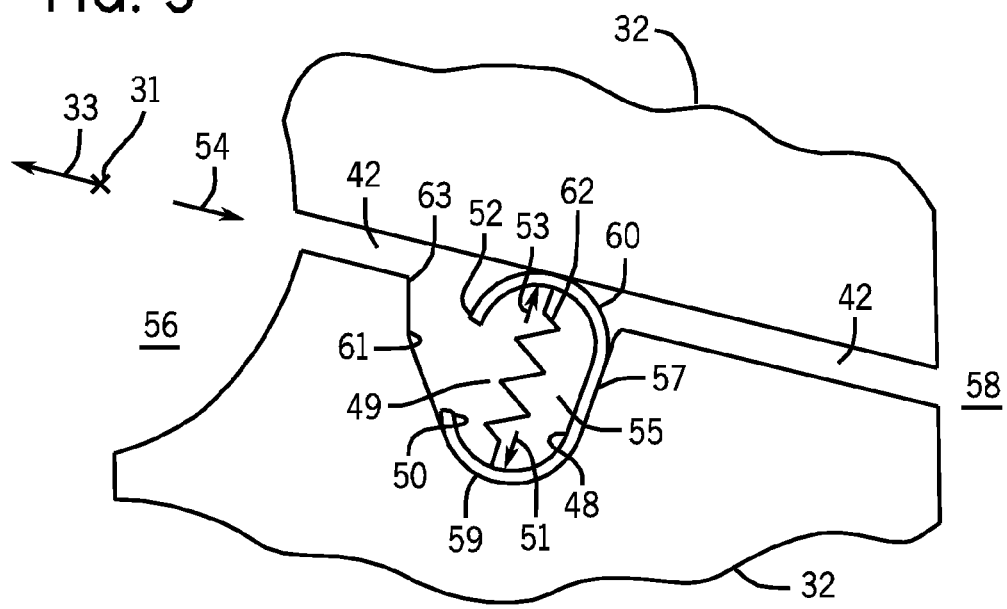

FLEXIBLE SEAL FOR TURBINE ENGINE

BACKGROUND OF THE INVENTION

The subject matter disclosed herein relates to a flexible seal for use in a turbine engine.

A gas turbine engine combusts a mixture of fuel and air to generate hot combustion gases, which in turn drive one or more turbines. In particular, the hot combustion gases force turbine bucket segments to rotate, thereby driving a shaft to rotate one or more loads, e.g., electrical generator. These turbine bucket segments may include shanks that allow for adjacent placement in a turbine stage of the gas turbine engine. At the same time, highly compressed air is often extracted from a compressor for utilization in pressurizing a cavity formed between two adjacent bucket shanks. This positive pressure difference may aid in preventing hot combustion gases from entering into the shank cavity, thus avoiding increases in thermal stresses that adversely affect bucket life. However, as these bucket segments and their shanks may be individually produced and then combined into a single turbine stage, gaps may be present between the individual turbine bucket shanks. These gaps may provide a leakage path for the pressurized shank cavity air, thus reducing overall turbine efficiency and output. Accordingly, it is desirable to minimize the leakage of this pressurizing gas through gaps located between turbine bucket shanks in a turbine stage of a gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a seal pin sized for placement in a gap between two bucket segments of a turbine engine, wherein the seal pin comprises at least one straight portion and at least one curved portion, wherein the seal pin is configured to provide an opening in the seal pin.

In a second embodiment, a gas turbine engine includes a first bucket comprising a first airfoil and a first shank, a second bucket comprising a second airfoil and a second shank, wherein the second bucket is positioned adjacent to the first bucket to form a gap, and a seal pin sized for placement in the gap, wherein the seal pin comprises an opening configured to channel a fluid flow into a hollow region of the first bucket.

In a third embodiment, a method includes disposing an elongated flexible seal in a gap between a first and second shanks, wherein the elongated flexible seal comprises an opening configured to channel a fluid flow into a hollow region of the elongated flexible seal to induce expansion of the elongated flexible seal in the gap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a side view of an embodiment of two turbine bucket segments of the gas turbine engine of FIG. 1 sectioned through the longitudinal axis;

FIG. 3 is side view of an embodiment of a c-type flexible seal of FIG. 2;

FIG. 4 is a partial cross-sectional view of an embodiment of two turbine bucket segments of FIG. 2 through line 4-4, illustrating an embodiment of the flexible seal;

FIG. 5 is a partial cross-sectional view of an embodiment of two turbine bucket segments of FIG. 2 through line 4-4, illustrating an embodiment of the flexible seal;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a system and a method for closing a gap between adjacent turbine bucket shanks in a turbine stage of a turbine engine, such as a gas turbine engine, a steam turbine engine, or a hydro turbine engine. The system and method may include inserting a flexible seal, such as a flexible seal pin, between adjacent turbine bucket shanks. The preload value and pressure differentials between the turbine bucket shanks may allow for a positive seal to be achieved by applying pressure to a seal dispersed between any two adjacent bucket shanks. This seal may be, for example, c-shaped, spring loaded, double c-shaped, w-shaped, or formed in other shapes.

Figure 1:
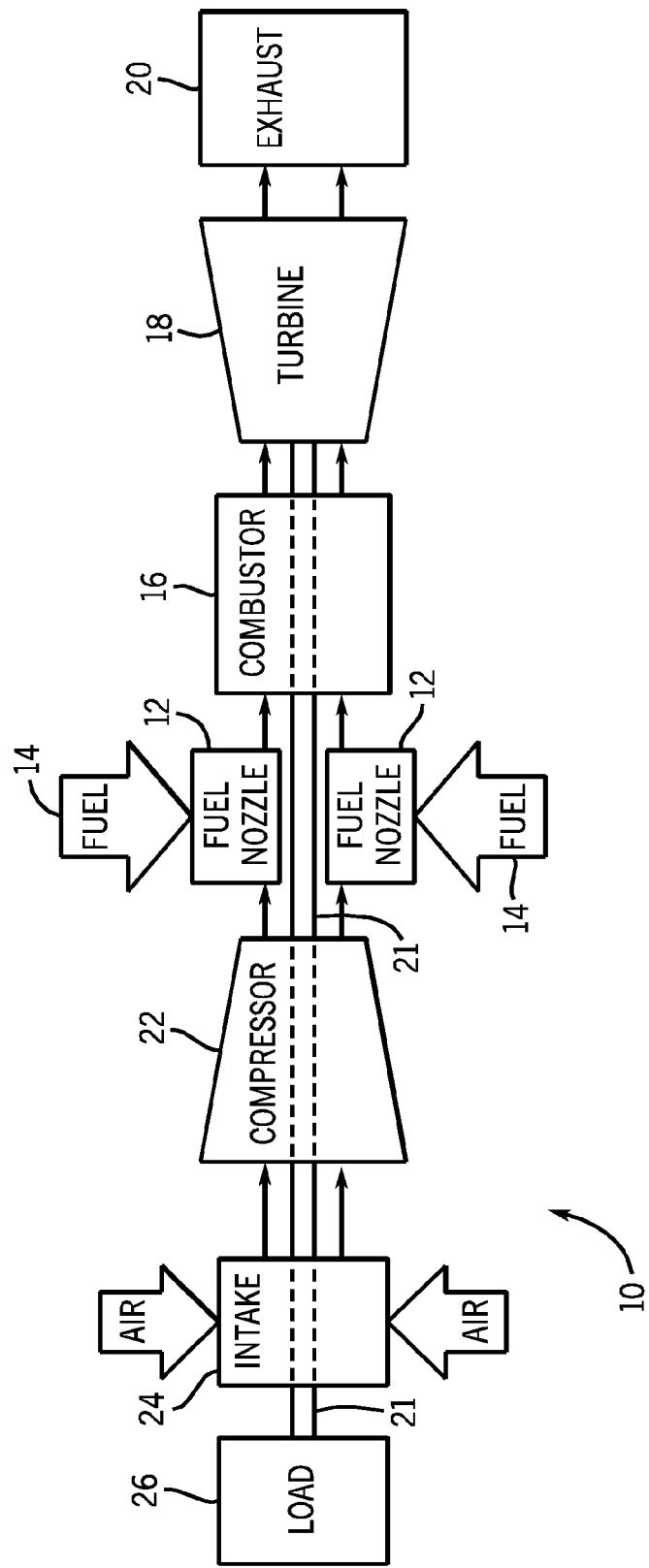
FIG. 1 is a schematic flow diagram of an embodiment of a gas turbine engine having turbine bucket platforms with flexible seals.

FIG. 1 is a block diagram of an exemplary turbine system including a gas turbine engine 10 that may employ turbine rotor buckets (i.e. blades). As discussed below, the buckets may include flexible seals, such as c-shaped flexible seals. In certain embodiments, the engine 10 may be utilized to power an aircraft, a watercraft, a locomotive, a power generation system, or combinations thereof. The illustrated gas turbine engine 10 includes fuel nozzles 12, which may intake a fuel supply 14 and mix the fuel with air, as well as distribute the air-fuel mixture into a combustor 16. The air-fuel mixture may combust in, for example, a chamber within combustor 16, thereby creating hot pressurized exhaust gases. The combustor 16 may direct the exhaust gases through a turbine 18 toward an exhaust outlet 20. As the exhaust gases pass through the turbine 18, the gases force turbine blades to rotate a shaft 21 along an axis of system 10. As illustrated, shaft 21 is connected to various components of the engine 10, including compressor 22. Compressor 22 also includes blades coupled to shaft 21. Thus, blades within compressor 22 rotate as shaft 21 rotates, compressing air from air intake 24 through compressor 22 into fuel nozzles 12 and/or combustor 16. Shaft 21 may also be connected to load 26, which may be a vehicle or a stationary load, such as an electrical generator in a power plant or a propeller on an aircraft. Load 26 may be any suitable device that is powered by the rotational output of the turbine engine 10.

FIG. 2 illustrates a side view of an embodiment of two turbine bucket segments 32 of the turbine 18 portion of the gas turbine engine 12 of FIG. 1, as well as a legend that illustrates the orientation of the bucket segments 32 in a radial direction 31, an axial direction 33, and a circumferential direction 35. The turbine bucket segments 32 may, for example, be coupled to the shaft 21 via rotor wheels, and may be partially disposed within the path of the hot combustion gases as part of a single stage gas turbine, a dual-stage turbine system that includes a low-pressure turbine and a high-pressure turbine, or in a multi-stage turbine system with three or more turbine stages. Alternatively, the turbine bucket segments 32 may be disposed in a steam turbine or a hydro turbine. For illustrative purposes, only two turbine bucket segments 32 are illustrated in FIG. 2; however, it should be noted that multiple turbine bucket segments 32 may be arranged, for example, to form a circular structure in the turbine 18.

The bucket segments 32 may be constructed of a metal, metal alloy, ceramic matrix composite (CMC), or other suitable material. Each bucket segment 32 includes a wheel mount 34, a platform 37, a shank 36, a platform 38, and a bucket or blade 40. In the illustrated embodiment, each bucket segment 32 includes a dovetail 34 as the wheel mount to couple the bucket segments 32 with a corresponding groove (e.g., axial 33 groove) of a rotor wheel in the turbine 18. Thus, the dovetail 34 extends into the wheel and the platform 37 rests on the wheel to support the shank 36. The shank 36 extends radially 31 outward from the dovetail 34 to the platform 38, which may be a ledge or base that supports the bucket or blade 40. For example, the bucket 40 may be an airfoil 40 extending radially 31 outward from the platform 38. The buckets 40 (e.g. airfoils) are disposed within the path of the hot combustion gases. In operation, the hot combustion gases exert motive forces on the airfoils 40 to drive the turbine 18.

As illustrated, the bucket segments 32 are positioned in an annular arrangement circumferentially 35 adjacent one another, with a cavity formed therebetween. This cavity may, for example, be a pressurized cavity that receives compressed air from the compressor 22 to prevent the hot combustion gases of the to enter into shank cavity, thus avoiding potential increases in thermal stresses affecting bucket life. However, in this configuration, the shape of the bucket segments 32 may cause a gap 42 (e.g., a leakage path from the cavity) to be present between the adjacent bucket segments 32. This gap 42 may extend radially 31 along the shank 36 from the dovetail 34 to radially 31 beneath a damper opening 44, which may be located between the adjacent shanks 36 and radially 31 below the airfoil 40 of each of the bucket segments 32. This gap 42 may allow for cross-shank leakage of the pressurized shank cavity air between the bucket segments 32. Unfortunately, this leakage may reduce the overall efficiency of the turbine 10 during use. Accordingly, it may be desirable to prevent this cross-shank leakage from occurring through the use of, for example, one or more flexible seals 46 in the gap 42.

FIG. 3 illustrates a side view of an embodiment of a flexible seal (e.g. a c-type seal 46) that may be utilized for sealing the gap 42 between bucket segments 32. The flexible seal may, for example, include flexible seals having any number of C-shaped portions to define a single C-shape, a double C-shape (e.g., a W-shape), or other shapes, wherein the C-shapes extend along an axis of the flexible seal. This flexible seal may be a flexible seal pin characterized as a c-type seal 46 that includes a straight portion 48 as well as two curved portions 50 and 52 that combine to form an opening 49 in the c-type seal 46. In other words, the flexible seal may be defined as an elongated seal with a c-shaped cross-section along its length. For example, the c-type flexible seal 46 may be an extended c-shape with a uniform c-shaped cross-section along its length. Each of the curved portions 50 and 52 of the c-type seal 46 may flex when pressure is applied, such that the curved portions 50 and 52 may move closer in proximity to one another. This pressure may be caused, for example, by thermal expansion of the bucket segments 32 when the c-type seal 46 is fitted into gap 42. Accordingly, it may be desirable for the material utilized in making the c-type seal 46 to have a coefficient of thermal expansion that is greater than the bucket segments 32. As such, the c-type seal 46 may be made from nickel, cobalt, or iron-base superalloys, or other suitable materials, with desirable mechanical properties able to withstand turbine operating temperatures and conditions (such as 310 stainless steel). Examples of usable superalloys may include Inconel® alloy 600, Inconel® alloy 625, Inconel® alloy 718, Inconel® alloy 738, Inconel® alloy X-750, or Hastalloy® X. The material chosen for the c-type seal 46 may be based on requirements for mechanical strength, creep resistance at high temperatures, corrosion resistance, or other attributes. The c-type seal 46 may be sized such that it fits into the gap 42. An illustration of the c-type seal 46 installed between two bucket segments 32 is illustrated in FIG. 4.

FIG. 4 illustrates a cross-sectional view of the bucket segments 32 along line 4-4 of FIG. 2, illustrating an embodiment of the flexible seal (e.g. a c-type seal 46). As illustrated, the c-type seal 46 may be a flexible seal pin inserted between the bucket segments 32, such that the c-type seal 46 maintains a positive seal despite variations in the gap 42 to block cross-shank leakage of gas along line 54. For example, the c-type seal 46 may provide a resiliency, a flexibility, or a spring-force, which creates a pre-load in the gap 42 between the bucket segments 32. In other words, the curved portions 50 and 52 may flex or bend toward one under upon installation in the gap 42 between the bucket segments 32, such that the curved portions 50 and 52 import outward forces 51 and 53 toward the adjacent bucket segments 32. In this manner, the c-type seal 46 may be preloaded into position in a hollow region 55 of one of the bucket segments 32. For example, the c-type seal 46 may be loaded into a hollow region 55 of one of the bucket segments 32 that includes a flat portion 57 configured to receive the c-type seal 46, a curved portion 59 adjacent the flat portion 57, and a ramped portion 61 angled toward the curved portion 59. The ramped portion 61 may also receive gas from a gas entry portion 63 that direct a gas flow from path 54 toward the seal support portion 57, as well as the c-type seal 46 when positioned in the hollow region 55.

As each of the bucket segments 32 applies force to one of the curved portion 50 and 52, the curved portions 50 and 52 import the outward forces 51 and 53 to define the preload on the bucket segments 32. Moreover, pressure differentials between gases present in the frontside 56 (e.g., upstream side) of the bucket segments 32 and the backside 58 (e.g., downstream side) of the bucket segments 32 may also aid in creating a seal to prevent cross-shank leakage across gap 42. For example, pressure of gases present in the frontside 56 of the bucket segments 32 may be greater than that present in the backside 58 of the bucket segments 32. In this manner, gases may, for example, pass along line 54 and be channeled by the opening 49 in the c-type seal 46 into hollow region 55 to cause the c-type seal 46 to seal gap 42. For example, the pressure of the gases in the hollow region 55 inside the c-type seal 46 may cause expansion of the c-type seal 46, thereby increasing the outward forces 51 and 53 of the curved portions 50 and 52 on the adjacent bucket segments 32. Thus, the c-type seal 46 provides a preload attributed to the c-shape (e.g., outward bias of the cured portions 50 and 52) and an additional load attributed to the pressure of gases expanding the c-shape during operation. However, it is envisioned that other types of flexible seals 46 may be utilized to seal gap 42 between bucket segments 32.

FIG. 5 illustrates a cross-sectional view of the bucket segments 32 along line 4-4 of FIG. 2, illustrating an embodiment of flexible seal (e.g., a c-type biased seal 60) with a biasing element 62, such as a spring. As illustrated, the flexible seal utilized to seal the gap 42 between bucket segments 32 may be a flexible seal pin, such as a c-type biased seal 60. For example, the c-type biased seal 60 may provide a resiliency, a flexibility, or a biasing-force, which creates a pre-load in the gap 42 between the bucket segments 32. In other words, the curved portions 50 and 52 may flex or bend toward one under upon installation in the gap 42 between the bucket segments 32, such that the curved portions 50 and 52 import outward forces 51 and 53 toward the adjacent bucket segments 32. In this manner, the c-type biased seal 60 may be preloaded into position in a hollow region 55 of one of the bucket segments 32. As each of the bucket segments 32 applies force to curved portion 50 and 52 of the c-type biased seal 60, the curved portions 50 and 52 impart the outward forces 51 and 53 to define the preload on the bucket segments 32.

The c-type biased seal 60 may be made out of the same or a similar type of material as was utilized in making the c-type seal 46. Additionally, the c-type biased seal 60 may have the same or similar dimensions as the c-type seal 46. Accordingly, the c-type biased seal 60 may include a straight portion 48 as well as two curved portions 50 and 52 that may allow for an opening 49 to be formed therebetween. It should be noted that each of the curved portions 50 and 52 of the c-type biased seal 60 may flex when pressure is applied, such that the curved portions 50 and 52 may move closer in proximity to one another. This pressure may be caused, for example, by thermal expansion of the bucket segments 32 when the c-type biased seal 60 is fitted into gap 42. Additionally, gases may, for example, pass along line 54 and be channeled by the opening 49 in the c-type biased seal 60 into hollow region 55 to cause the c-type biased seal 60 to seal gap 42. For example, the pressure of the gases in the hollow region 55 inside the c-type biased seal 60 may cause expansion of the c-type biased seal 60, thereby increasing the outward forces 51 and 53 of the curved portions 50 and 52 on the adjacent bucket segments 32. Thus, the c-type biased seal 60 provides a preload attributed to the c-shape (e.g., outward bias of the cured portions 50 and 52) and an additional load attributed to the pressure of gases expanding the c-shape during operation. Thus, the c-type biased seal 60 may be loaded into a hollow region 55 of one of the bucket segments 32 that includes a flat portion 57 configured to receive the c-type biased seal 60, a curved portion 59 adjacent the flat portion 57, and a ramped portion 61 angled toward the curved portion 59. The ramped portion 61 may also receive gas from a gas entry portion 63 that direct a gas flow from path 54 toward the seal support portion 57, as well as the c-type biased seal 60 when positioned in the hollow region 55.

Moreover, the c-type biased seal 60 may further include a biasing element 62. This biasing element 62 may be attached to the c-type biased seal 60 at curved portions 50 and 52, such that the biasing element 62 may run in a substantially parallel direction as straight portion 48 of the c-type biased seal 60. The biasing element 62 increases the outward forces 51 and 53 of the curved portions 50 and 52 on the adjacent bucket segments 32. Thus, the outward forces 51 and 53 may include a biasing force of the biasing element 62, the gas pressure of gas inside the c-type biased seal 60, and the integral force of the curved portions 50 and 52 relative to the straight portion 48. Again, the biasing forces combine with the pressure differential between gases present in the frontside 56 of the bucket segments 32 and the backside 58 of the bucket segments 32 to aid in creating a positive seal to block cross-shank leakage across gap 42, for example, along line 54. In one embodiment, the reaction force due to the biasing and pressure differential pressure of gases present in the frontside 56 and backside 58 of the bucket segments 32 may be represented by the equation: $F_{rs}=(P_h-P_1)\times r_{i-seal}\times L_{seal}\times K_{seal}\times \delta \pm F_c \sin(\theta)$, whereby $F_{rs}$ is the reaction force due to the biasing and pressure differential pressure of gases present in the frontside 56 and backside 58 of the bucket segments 32, $P_h$ is the frontside 56 pressure, $P_1$ is the backside pressure 58, $r_{i-seal}$ is the inner radius of the c-type biased seal 60, $L_{seal}$ is the length of the c-type biased seal 60, $K_{seal}$ is the biasing coefficient of biasing element 62, $\delta$ is the springback value of the c-type biased seal 60, $F_c$ is pull force on the c-type biased seal 60, and $\theta$ is the shank face angle of the c-type biased seal 60 relative to the radial 31 centerline of the gap 42. Additionally, the pull force on the c-type biased seal 60 may be calculated as the product of the mass of the c-type biased seal 60, the radius of the c-type biased seal 60 from the centerline of the engine 10, and the square of the speed of the engine 10. Analysis of the reaction force described above may be utilized to determine the load that will be present on the c-type biased seal 60 to insure positive sealing of the gap 42 by the c-type biased seal 60 to prevent cross-shank leakage between the two bucket segments 32.

Figure 6:
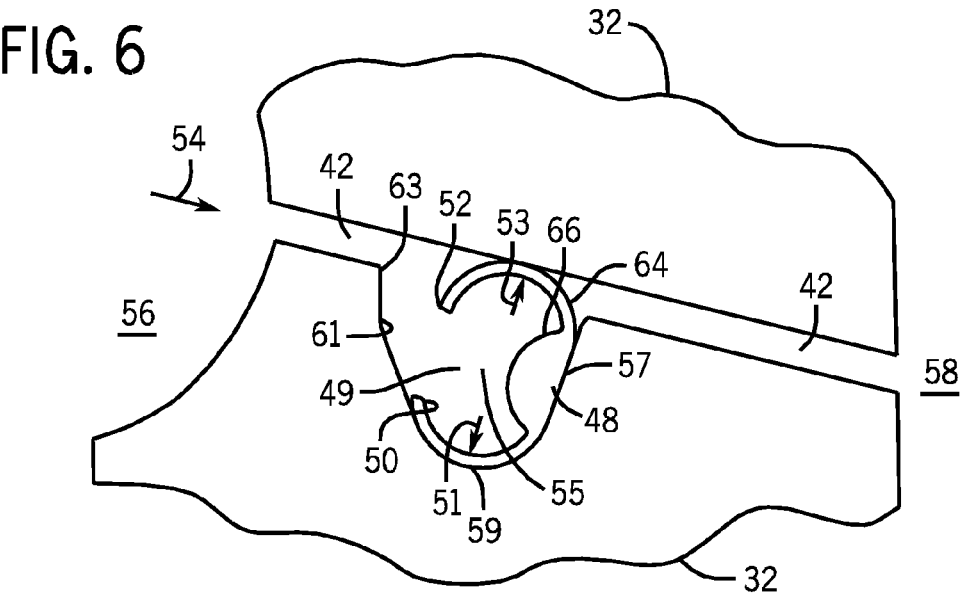
FIG. 6 is a partial cross-sectional view of an embodiment of two turbine bucket segments of FIG. 2 through line 4-4, illustrating an embodiment of the flexible seal.

FIG. 6 illustrates a cross-sectional view of the bucket segments 32 along line 4-4 of FIG. 2, illustrating an embodiment of a flexible seal (e.g., a c-type bulged seal 64) with a bulged portion 66. As illustrated, the flexible seal utilized to seal the gap 42 between bucket segments 32 may be a flexible seal pin, such as a c-type bulged seal 64. For example, the c-type bulged seal 64 may provide additional stiffness and strength to the seal 64, a resiliency, or a spring-force, which creates a pre-load in the gap 42 between the bucket segments 32. In other words, the curved portions 50 and 52 may flex or bend toward one under upon installation in the gap 42 between the bucket segments 32, such that the curved portions 50 and 52 import outward forces 51 and 53 toward the adjacent bucket segments 32. In this manner, the c-type bulged seal 64 may be preloaded into position in a hollow region 55 of one of the bucket segments 32. As each of the bucket segments 32 applies force to curved portion 50 and 52 of the c-type bulged seal 64, the curved portions 50 and 52 impart the outward forces 51 and 53 to define the preload on the bucket segments 32.

The c-type bulged seal 64 may be made out of the same or a similar type of material as was utilized in making the c-type seal 46. Additionally, the c-type bulged seal 64 may have the same or similar dimensions as the c-type seal 46. Accordingly, the c-type bulged seal 64 may include a straight portion 48 as well as two curved portions 50 and 52 that may allow for an opening 49 to be formed therebetween. It should be noted that each of the curved portions 50 and 52 of the c-type bulged seal 64 may flex when pressure is applied, such that the curved portions 50 and 52 may move closer in proximity to one another. This pressure may be caused, for example, by thermal expansion of the bucket segments 32 when the c-type bulged seal 64 is fitted into gap 42.

As illustrated, the c-type bulged seal 64 may be inserted between the bucket segments 32, such that the c-type bulged seal 64 maintains a positive seal despite variations in the gap 42 to block cross-shank leakage of gas along line 54. Thus, the c-type bulged seal 64 may be loaded into a hollow region 55 of one of the bucket segments 32 that includes a flat portion 57 configured to receive the c-type bulged seal 64, a curved portion 59 adjacent the flat portion 57, and a ramped portion 61 angled toward the curved portion 59. The ramped portion 61 may also receive gas from a gas entry portion 63 that direct a gas flow from path 54 toward the seal support portion 57, as well as the c-type bulged seal 64 when positioned in the hollow region 55.

The c-type bulged seal 64 may also include the bulged portion 66 that extends along the straight portion 48 of the c-type bulged seal 64. This bulged portion 66 may extend towards the opening 49 formed by curved portions 50 and 52 and may operate to provide increased stiffness to the c-type bulged seal 64. For example, the bulged portion 66 may increase the stiffness of the integral spring force associated with the curved portions 50 and 52, thereby increasing the outward forces 51 and 53 of the curved portions 50 and 52 on the adjacent bucket segments 32. Thus, the bulged portion 66 may operate in conjunction with any pressure differential between gases present in the frontside 56 of the bucket segments 32 and the backside 58 of the bucket segments 32 to increase the forces 50 and 52 to provide a more positive seal to prevent cross-shank leakage across gap 42. For example, gases at a relatively higher pressure than gases in the backside 58 of the bucket segments 32 may pass along line 54 and may be channeled by the opening 49 in the c-type bulged seal 64 into hollow region 55 to cause the c-type bulged seal 64 to seal gap 42. That is, the pressure of the gases in the hollow region 55 inside the c-type bulged seal 64 may cause expansion of the c-type bulged seal 64, thereby increasing the outward forces 51 and 53 of the curved portions 50 and 52 on the adjacent bucket segments 32. Thus, the c-type bulged seal 64 provides a preload attributed to the c-shape (e.g., outward bias of the cured portions 50 and 52) and an additional load attributed to the pressure of gases expanding the c-shape during operation.

Figure 7:
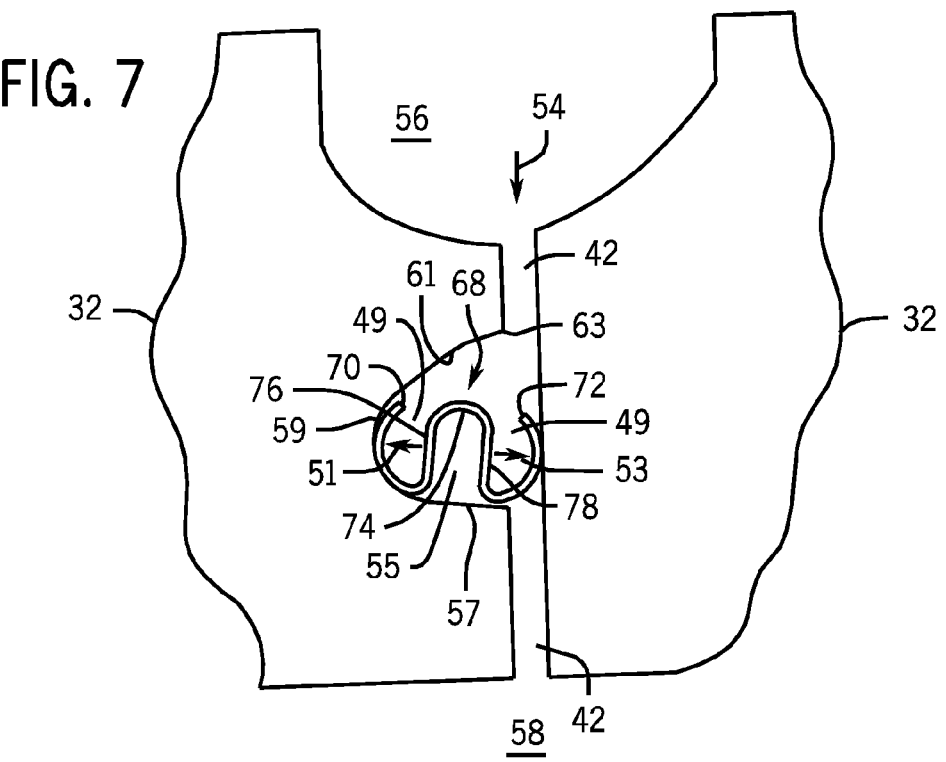
FIG. 7 is a partial cross-sectional view of an embodiment of two turbine bucket segments of FIG. 2 through line 4-4, illustrating an embodiment of the flexible seal.

FIG. 7 illustrates a cross-sectional view of the bucket segments 32 along line 4-4 of FIG. 2 illustrating an embodiment of a flexible seal with a w-shape (e.g., a w-type seal 68). As illustrated, the flexible seal utilized to seal the gap 42 between bucket segments 32 may be a flexible seal pin, such as a w-type seal 68. For example, the w-type seal 68 may provide a resiliency, a flexibility, or a spring-force, which creates a pre-load in the gap 42 between the bucket segments 32. In other words, the curved portions 70 and 72 may flex or bend toward one under upon installation in the gap 42 between the bucket segments 32, such that the curved portions 70 and 72 import outward forces 51 and 53 toward the adjacent bucket segments 32. In this manner, the w-type seal 68 may be preloaded into position in a hollow region 55 of one of the bucket segments 32. As each of the bucket segments 32 applies force to curved portion 70 and 72 of the w-type seal 68, the curved portions 70 and 72 impart the outward forces 51 and 53 to define the preload on the bucket segments 32.

The w-type seal 68 may be made out of the same or a similar type of material as was utilized in making the c-type seal 46. Additionally, as noted above, the w-type seal 68 may include two external curved portions 70 and 72 connected to an inverted curved portion 74 via straight portions 76 and 78. In contrast to the c-type seals 46, 60, and 64, the w-type seal 68 includes a greater number of turns, and thus may have greater integral spring force attributed to the multiple turns (e.g., curved portions 70, 72, and 74). As a result, the multiple turns of the w-type seal 68 may substantially increase the outward forces 51 and 53 of the curved portions 70 and 72 on the adjacent bucket segments 32. In the illustrated embodiment, an opening 49 is formed between each of curved portions 70 and 72 and inverted curved portion 74. These openings 49 channel any gases traveling along line 54 into the openings 49 within the hollow region 55, thereby causing expansion of the w-type seal 68 to provide a more positive seal of the gap 42. Thus, the gas pressure increases the outward forces 51 and 53 of the curved portions 70 and 72 against the adjacent bucket segments 32. Each of the curved portions 70 and 72 of the w-type seal 68 may flex when pressure is applied, such that the curved portions 70 and 72 may move closer in proximity to one another. This pressure may be caused, for example, by thermal expansion of the bucket segments 32 when the w-type seal 68 is fitted into gap 42. Despite the variation in the gap 42, the w-type seal 68 provides the outward forces 51 and 53 to maintain a positive seal.

As illustrated, the w-type seal 68 may be inserted between the bucket segments 32, such that the w-type seal 68 may generate a positive seal that prevents cross-shank leakage of gas along line 54. Thus, the w-type seal 68 may be loaded into a hollow region 55 of one of the bucket segments 32 that includes a flat portion 57 configured to receive the w-type seal 68, a curved portion 59 adjacent the flat portion 57, and a ramped portion 61 angled toward the curved portion 59. The ramped portion 61 may also receive gas from a gas entry portion 63 that direct a gas flow from path 54 toward the seal support portion 57, as well as the w-type seal 68 when positioned in the hollow region 55.

The inverted curved portion 74 of the w-type seal 68 may operate to provide increased stiffness to the w-type seal 68. Thus, the inverted curved portion 74 may operate in conjunction with any pressure differentials between gases present in the frontside 56 of the bucket segments 32 and the backside 58 of the bucket segments 32 to aid in creating a seal to prevent cross-shank leakage across gap 42. For example, gases at a relatively higher pressure than gases in the backside 58 of the bucket segments 32 may pass along line 54 and interface with w-type seal 68 to cause w-type seal 68 to seal gap 42 to prevent cross-shank leakage. That is, the pressure of the gases in the hollow region 55 inside the w-type seal 68 may cause expansion of the w-type seal 68, thereby increasing the outward forces 51 and 53 of the curved portions 70 and 72 on the adjacent bucket segments 32. Thus, the w-type seal 68 provides a preload attributed to its w-shape (e.g., outward bias of the cured portions 70 and 72) and an additional load attributed to the pressure of gases expanding the w-shape during operation.

Figure 8:
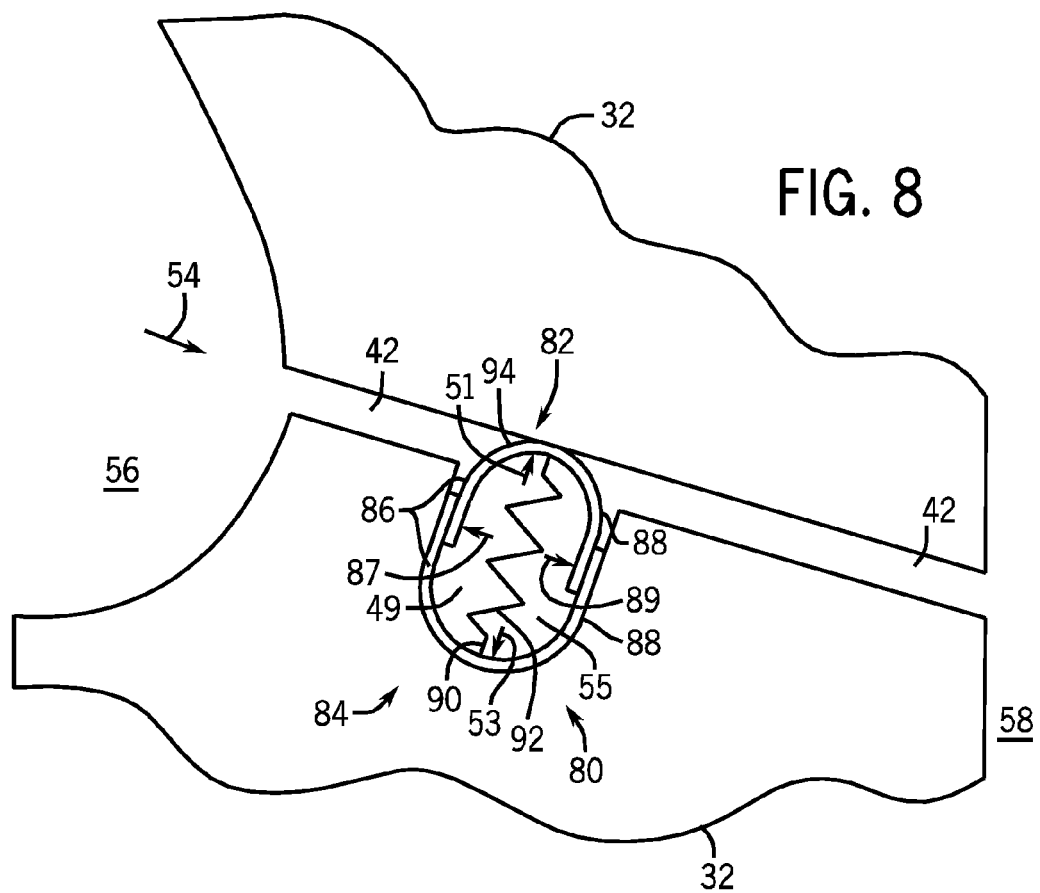
FIG. 8 is a partial cross-sectional view of an embodiment of two turbine bucket segments of FIG. 2 through line 4-4, illustrating an embodiment of the flexible seal.

FIG. 8 illustrates a cross-sectional view of the bucket segments 32 along line 4-4 of FIG. 2, illustrating a flexible seal with a double c-shape configuration (e.g., a double c-type seal 80). As illustrated, the flexible seal utilized to seal the gap 42 between bucket segments 32 may be a flexible seal pin, such as a double c-type seal 80. The double c-type seal 80 may be made out of the same or a similar type of material as was utilized in making the c-type seal 46. The double c-type seal 80 may include, for example, a combination of two c-type seals 82 and 84 each with two straight portions 86 and 88 connected via a curved portion 90. In one embodiment, each of the straight portions 86 and 88 form an opening 49 and each of the straight portions 86 and 88 may be coupled to one another to form the double c-type seal 80. For example, the straight portions 86 and 88 of the adjacent c-type seals 82 and 84 overlap and move along one another, as the curved portions 90 moved toward and away from one another. In this manner, the double c-type seal 80 may provide a resiliency, a flexibility, or a spring-force, which creates a pre-load in the gap 42 between the bucket segments 32. In other words, the curved portions 90 move towards toward one under upon installation in the gap 42 between the bucket segments 32, such that the curved portions 90 import outward forces 51 and 53 toward the adjacent bucket segments 32. In this manner, the double c-type seal 80 may be preloaded into position in a hollow region 55 of one of the bucket segments 32. As each of the bucket segments 32 applies force to curved portions 90 and 72 of the double c-type seal 80, the curved portions 90 impart the outward forces 51 and 53 to define the preload on the bucket segments 32.

Additionally, a biasing element 92, such as a spring, may be coupled to each curved portion 90 of the double c-type seal 80. This biasing element 92 may be attached to the double c-type seal 80 may run in a substantially parallel direction as straight portions 86 and 88 of the double c-type seal 80. The biasing element 92 biases the adjacent c-type seals 82 and 84 away from one another to import outward forces 51 and 53 from the curved portions 90 to the adjacent bucket segments 32. Thus, the biasing element 92 creates a preload of the double c-type seal 80 within the gap 42, thereby ensuring a positive seal despite variations in the gap 42 to block cross-shank leakage across gap 42, for example, along line 54. Each of the c-type seals 82 and 84 of the double c-type seal 80 move toward one another against the biasing element 92 as the bucket segments 32 move closer in proximity to one another. This pressure may be caused, for example, by thermal expansion of the bucket segments 32 when the double c-type seal 80 is fitted into gap 42. Accordingly, as illustrated, the double c-type seal 80 may be inserted between the bucket segments 32, such that the double c-type seal 80 may generate a positive seal that prevents cross-shank leakage of gas along line 54.

In certain embodiments, each curved portion 90 biases the adjacent straight portions 86 and 88 away from one another to create outward forces 87 and 89. For example, the straight portions 86 and 88 may be compressed toward one another during installation into the hollow region 55, thereby creating a preload of the double c-type seal 80 in the hollow region 55, as indicated by forces 87 and 89. Thus, the double c-type seal 80 may be positively seal within the hollow region 55, while also imparting a positive seal (e.g., outward forces 51 and 53) in the gap 42.

In addition, certain embodiments of the double c-type seal 80 may include an upstream opening 94, which allows gases to enter the hollow region 55, inside the seal 80. For example, the gases from the front side 56 may enter the seal 80 as indicated by arrow 54, and expand the adjacent c-type seals 82 and 84 away from one another to supplement the biasing force of the biasing element 92. Together, the biasing element 92 and gases provide the outward forces 51 and 53 across the gap 42 against the adjacent bucket segments 32, thereby providing a positive seal.

Figure 9:
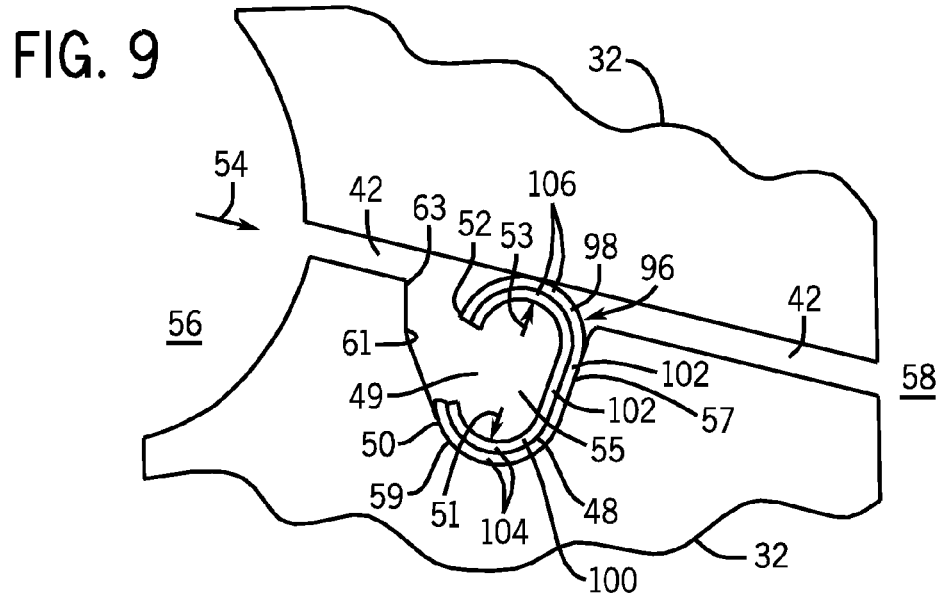
FIG. 9 is a partial cross-sectional view of an embodiment of two turbine bucket segments of FIG. 2 through line 4-4, illustrating an embodiment of the flexible seal.

FIG. 9 illustrates a cross-sectional view of the bucket segments 32 along line 4-4 of FIG. 2, illustrating a illustrating a flexible seal with a concentric c-shape configuration (e.g., a concentric c-type seal 96). The concentric c-type seal 96 may include, for example, a combination of two c-type seals 98 and 100 each with a straight portion 102 connected via a two curved portions 104 and 106. Each of the two c-type seals 98 and 100 of the concentric c-type seal 96 may be made out of the same or a similar type of material as was utilized in making the c-type seal 46, however, in one embodiment, the materials used in making c-type seals 98 and 100 may have different coefficients of thermal expansion (e.g., alphas). For example, c-type seal 100 may have a greater coefficient of thermal expansion than c-type seal 98.

In one embodiment, the straight portion 102 of the c-type seals 98 and 100 form an opening 49 and the straight portion 102 of the c-type seals 98 and 100 may be coupled to one another to form the concentric c-type seal 96. As illustrated, the concentric c-type seal 96 may be a flexible seal pin inserted between the bucket segments 32, such that the concentric c-type seal 96 maintains a positive seal despite variations in the gap 42 to block cross-shank leakage of gas along line 54. For example, the concentric c-type seal 96 may provide a resiliency, a flexibility, or a spring-force, which creates a pre-load in the gap 42 between the bucket segments 32. In other words, the curved portions 104 and 106 may flex or bend toward one under upon installation in the gap 42 between the bucket segments 32, such that the curved portions 104 and 106 import outward forces 51 and 53 toward the adjacent bucket segments 32. In this manner, the concentric c-type seal 96 may be preloaded into position in a hollow region 55 of one of the bucket segments 32. For example, the concentric c-type seal 96 may be loaded into a hollow region 55 of one of the bucket segments 32 that includes a flat portion 57 configured to receive the concentric c-type seal 96, a curved portion 59 adjacent the flat portion 57, and a ramped portion 61 angled toward the curved portion 59. The ramped portion 61 may also receive gas from a gas entry portion 63 that direct a gas flow from path 54 toward the seal support portion 57, as well as the concentric c-type seal 96 when positioned in the hollow region 55.

As each of the bucket segments 32 applies force to one of the curved portions 104 and 106, the curved portions 104 and 106 import the outward forces 51 and 53 to define the preload on the bucket segments 32. Moreover, pressure differentials between gases present in the frontside 56 (e.g., upstream side) of the bucket segments 32 and the backside 58 (e.g., downstream side) of the bucket segments 32 may also aid in creating a seal to prevent cross-shank leakage across gap 42. For example, pressure of gases present in the frontside 56 of the bucket segments 32 may be greater than that present in the backside 58 of the bucket segments 32. In this manner, gases may, for example, pass along line 54 and be channeled by the opening 49 in the concentric c-type seal 96 into hollow region 55 to cause the concentric c-type seal 96 to seal gap 42. For example, the pressure of the gases in the hollow region 55 inside the concentric c-type seal 96 may cause expansion of the concentric c-type seal 96, thereby increasing the outward forces 51 and 53 of the curved portions 104 and 106 on the adjacent bucket segments 32. Thus, the concentric c-type seal 96 provides a preload attributed to the c-shape (e.g., outward bias of the cured portions 104 and 106) and an additional load attributed to the pressure of gases expanding the c-shape during operation. Additionally, differing coefficients of thermal expansion between c-type seals 98 and 100 of the concentric c-type seal 96 may also aid in increasing the outward forces 51 and 53 of the curved portions 104 and 106 on the adjacent bucket segments 32 to aid in forming a seal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a seal, comprising:
        a first elongated structure having a first axis;
        a first opening into the first elongated structure, wherein the first opening extends along the first axis;
        a first portion of the first elongated structure disposed on a first side of the first opening, wherein the first portion extends along the first axis;
        a second portion of the first elongated structure disposed on a second side of the first opening, wherein the second portion extends along the first axis, and the first and second portions are configured to pre-load the seal along a gap between first and second bucket segments of a turbine, wherein the first opening channels a fluid flow into a hollow region of the seal to induce expansion of the seal in the gap during operation of the turbine.

2. The system of claim 1, wherein the first portion comprises a first curved portion and the second portion comprises a second curved portion.

3. The system of claim 2, comprising a first flat portion of the first elongated structure, wherein the first flat portion extends along the first axis between the first and second curved portions.

4. The system of claim 2, comprising a first bulged portion of the first elongated structure, wherein the first bulged portion extends along the first axis between the first and second curved portions.

5. The system of claim 1, wherein the first elongated structure comprises a first C-shape extending along the first axis.

6. The system of claim 5, comprising a biasing element extending across the C-shape.

7. The system of claim 5, comprising a second elongated structure having a second C-shape extending along the first axis, wherein the first and second C-shapes are concentrically aligned about a common interior.

8. The system of claim 5, comprising a second elongated structure having a second axis, wherein the second elongated structure has a second C-shape extending along the second axis, and the first and second C-shapes face one another about a common interior.

9. The system of claim 8, comprising a biasing element extending across the common interior between the first and second C-shapes.

10. The system of claim 1, wherein the first elongated structure comprises a W-shape extending along the first axis.

11. The system of claim 1, the system further comprising the first bucket segment having the seal.

12. A system, comprising:
    a first turbine segment comprising a first blade coupled to a first shank;
    a second turbine segment comprising a second blade coupled to a second shank; and
    an elongated flexible seal disposed in a gap between the first and second shanks of a turbine, wherein the elongated flexible seal comprises an opening that channels a fluid flow into a hollow region of the elongated flexible seal to induce expansion of the elongated flexible seal in the gap during operation of the turbine.

13. The system of claim 12, comprising a biasing element disposed in the hollow region of the elongated flexible seal.

14. The system of claim 12, wherein the opening extends along an axis of the elongated flexible seal.

15. The system of claim 12, wherein the elongated flexible seal extends along the gap between the first and second shanks in a radial direction relative to a rotational axis of the first and second turbine segments, and the elongated flexible seal is disposed in an elongated recess in at least one of the first or second shank.

16. The system of claim 12, wherein the elongated flexible seal comprises at least one curved portion disposed about the hollow region, the curved portion extends about opposite sides of the opening, the opening extends along an axis of the elongated flexible seal, and the at least one curved portion extends along the axis of the elongated flexible seal.

17. The system of claim 16, wherein the at least one curved portion comprises a C-shaped portion that extends along the axis of the elongated flexible seal.

18. The system of claim 16, wherein the at least one curved portion comprises a W-shaped portion that extends along the axis of the elongated flexible seal.

19. A method, comprising:
    disposing an elongated flexible seal in a gap between first and second shanks of a turbine, wherein the elongated flexible seal comprises an opening that channels a fluid flow into a hollow region of the elongated flexible seal to induce expansion of the elongated flexible seal in the gap during operation of the turbine.

20. The method of claim 19, wherein disposing the elongated flexible seal in the gap comprises orienting the elongated flexible seal in a radial direction relative to a rotational axis of the first and second shanks, and disposing the elongated flexible seal in at least one of the first or second shank.

* * * * *